United States Patent
Tamura

(10) Patent No.: US 8,738,920 B2
(45) Date of Patent: May 27, 2014

(54) INFORMATION PROCESSING APPARATUS AND AUTHENTICATION INFORMATION MIGRATION METHOD

(75) Inventor: Yuu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/567,984

(22) Filed: Aug. 6, 2012

(65) Prior Publication Data

US 2012/0311700 A1 Dec. 6, 2012

Related U.S. Application Data

(63) Continuation of application No. 12/245,259, filed on Oct. 3, 2008, now Pat. No. 8,266,440.

(30) Foreign Application Priority Data

Oct. 5, 2007 (JP) .................................. 2007-262180

(51) Int. Cl.
*G06F 21/00* (2013.01)
(52) U.S. Cl.
USPC ........... 713/181; 713/155; 713/156; 713/157; 713/158; 713/159; 713/168

(58) Field of Classification Search
None
See application file for complete search history.

(56) References Cited

U.S. PATENT DOCUMENTS

| | | | |
|---|---|---|---|
| 7,313,697 B2 * | 12/2007 | Meyer et al. .................. | 713/168 |
| 2002/0095588 A1 * | 7/2002 | Shigematsu et al. .......... | 713/186 |
| 2005/0132190 A1 * | 6/2005 | Brokenshire et al. ......... | 713/168 |
| 2005/0237983 A1 * | 10/2005 | Khalil et al. .................. | 370/338 |

FOREIGN PATENT DOCUMENTS

| | | |
|---|---|---|
| JP | P2001-023300 A | 1/2001 |
| JP | P2001-209614 A | 8/2001 |
| JP | P2003-333038 A | 11/2003 |
| JP | P2005-522937 A | 7/2005 |

* cited by examiner

*Primary Examiner* — Ghazal Shehni
(74) *Attorney, Agent, or Firm* — Canon U.S.A. Inc., IP Division

(57) ABSTRACT

An information processing apparatus of the present invention converts user authentication information based on a second one-way function into a second converted value if authentication with a first converted value obtained by converting the user authentication information based on the first one-way function is successful.

9 Claims, 6 Drawing Sheets

500

| ACCOUNT NAME | HASH VALUE |
|---|---|
| User A | XXXXXXXX |
| User B | XXXXXXXX |
| ⋮ | ⋮ |
| ⋮ | ⋮ |

INFORMATION PROCESSING APPARATUS AND AUTHENTICATION INFORMATION MIGRATION METHOD

CROSS-REFERENCE TO RELATED APPLICATIONS

This application is a Continuation for U.S. application Ser. No. 12/245,259, filed Oct. 3, 2008, which claims priority from Japanese Patent Application No. 2007-262180 filed Oct. 5, 2007, which are hereby incorporated by reference herein in their entireties.

BACKGROUND OF THE INVENTION

1. Field of the Invention

The present invention relates to an information processing apparatus, an authentication method, and a computer program. In particular, the invention relates to a technique suitable for user authentication.

2. Description of the Related Art

A hash algorithm which has one-way and collision-resistant characteristics can be used when storing a password in a system. To be specific, the password is not stored as is, but a hash value of the password is stored.

In recent years, successful attacks against hash algorithms have revealed the vulnerability of a message digest (MD) 5 as a kind of hash function. Even if someone successfully attacks the hash algorithm, the password may not always be able to be obtained from a hash value. In the case of a hash algorithm being attacked, it is preferable to use a hash algorithm other than the attacked one in order to enhance security.

The following are conventional techniques for changing an algorithm. A technique discussed in Japanese Patent Application Laid-Open No. 2001-84271 first determines whether an algorithm version of data feature quantity extraction processing performed on an image, which is already registered in a system, includes an image different from that of a currently-used version. As a result of the determination, if an image different from that of the currently-used version is included, the currently-used data feature quantity extraction processing algorithm is applied to the image to obtain its feature quantity and weight information.

According to a technique discussed in Japanese Patent Application Laid-Open No. 2005-278065, a first device sends an old authentication key to a second device in a case where the first and second devices authenticate each other. Then, when the second device authenticates the old authentication key, a new authentication key is sent from the second device to the first device. Then, when the first device authenticates the new authentication key, the first device updates the old authentication key to the new authentication key.

According to the above conventional techniques, if a hash value of a password, which is obtained using the old hash algorithm, is already registered in a system, when the hash algorithm is changed, the following problems occur.

The hash value already registered in the system can be calculated only with the old hash algorithm. Therefore, if the hash algorithm is replaced by a new one, the hash value already registered in the system becomes invalid. Assuming that the old hash value is a hash value of a password, if a user enters a correct password, since the hash algorithm is changed, the resultant hash value is incorrect. As a result, the user cannot login to the system. Considering convenience for users, it is desirable to allow a user to log in to the system using the same password even if a hash algorithm is changed because the user does not need to recognize that the system is changed.

To that end, at the time of changing a hash algorithm, a hash value may be calculated using a new hash algorithm based on the old hash value stored in a system. With this method, a user can log in to the system using the same password before and after the change of the hash algorithm. The new hash value can be calculated only when the system knows the original password or the system can derive the original password from the old hash value.

However, it is very difficult to cause the system to recognize the original password. It is also very difficult to derive the original password from the old hash value because of one-way characteristic of a hash algorithm. Accordingly, the new hash value cannot be generated using the old hash value. Therefore, if the hash algorithm is changed, a user cannot log in to the system using the old password.

Alternatively, to allow a user to log in to the system, an administrator may reset a password for each user. In this case, a new hash value can be calculated based on a new hash algorithm using a password input by the administrator. Therefore, if the new hash value is stored in the system, a user can log in to the system using the password set by the administrator from then on. However, if it is necessary to reset passwords of many users, setting the passwords becomes burdensome to the administrator.

In addition, the system may automatically generate a new password to obtain a new hash value based on a new hash algorithm and notify each user of the new password. However, in any way, if a hash algorithm is changed, a user is forced to change a password.

SUMMARY OF THE INVENTION

According to an aspect of the present invention, an information processing apparatus that authenticates a user of the information processing apparatus, the information processing apparatus includes a storage medium, a communication bus, an acquisition unit configured to acquire authentication information of a user and issue the authentication information to the communication bus, a processing device that receives the authentication information from the communication bus, wherein the processing device includes a first conversion unit configured to convert the authentication information of the user into a first converted value based on a first one-way function, an authentication unit configured to compare the first converted value with a converted value already stored in the storage medium to authenticate the user, a second conversion unit configured to convert, if the first converted value matches the converted value already stored in the storage medium, the authentication information of the user into a second converted value based on a second one-way function, and a storage unit configured to store the second converted value in a storage medium.

According to an exemplary embodiment of the present invention, if authentication with a first converted value obtained by converting user authentication information based on a first one-way function is successful, an information processing apparatus converts the user authentication information based on a second one-way function into a second converted value, and then stores the second converted value. Accordingly, even if an algorithm (one-way function) used for converting user authentication information is changed, the user authentication information can be used as it is. Therefore, in the case of converting user authentication information based on a one-way function and storing the resultant value, an algorithm used for the convert can be changed without increasing a burden on an administrator and without reminding a user of the change of the algorithm.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
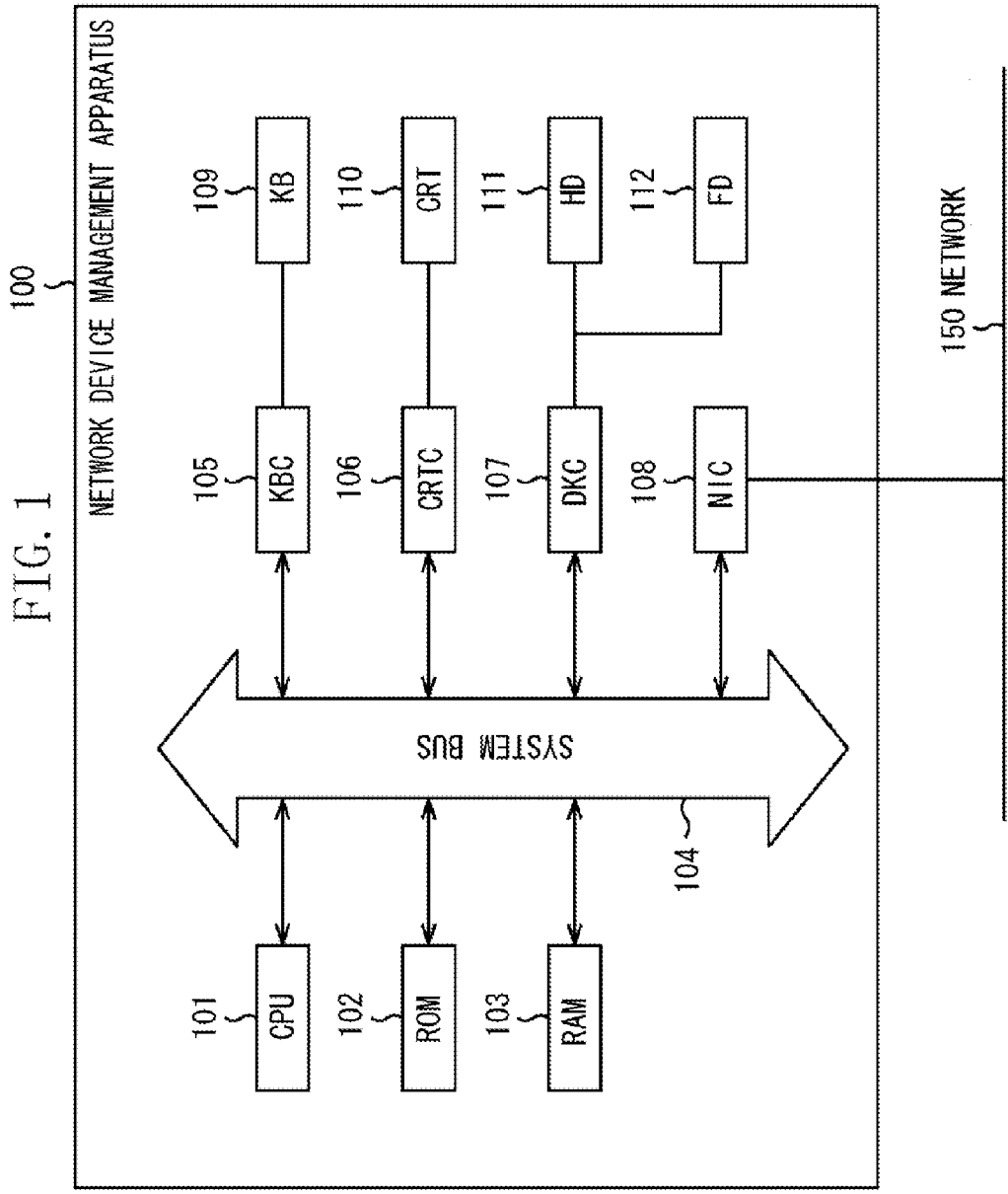
FIG. 1 illustrates an example of the hardware configuration of a network device management apparatus according to a first exemplary embodiment of the present invention.

FIG. 1 illustrates an example of the hardware configuration of a network device management apparatus according to a first exemplary embodiment of the present invention. As illustrated in FIG. 1, a network device management apparatus 100 can be implemented using a personal computer (PC).

In FIG. 1, a central processing unit (CPU) 101 executes an application program stored in a read only memory (ROM) 102 or a hard disk (HD) 111 or an application program supplied by a floppy disk (FD) 112. Further, the CPU 101 performs control over individual devices connected to a system bus 104. A random access memory (RAM) 103 functions as a main memory of the CPU 101 or a work area thereof. A keyboard controller (KBC) 105 controls instructions input from a keyboard (KB) 109 or a pointing device (not illustrated).

A cathode-ray tube (CRT) controller (CRTC) 106 controls display of a CRT display (CRT) 110. A disk controller (DKC) 107 controls accesses to the HD 111 and the FD 112. A network interface card (NIC) 108 exchanges data with external network devices through a network 150. A local area network (LAN) or the Internet can be used as the network 150.

The HD 111 or the FD 112 stores a boot program, various applications, edited files, user files, application programs, and network control programs. In the following, the CPU 101 functions as a main constituent of the hardware and an application program installed to the HD 111 is a main constituent of the software unless otherwise specified.

Figure 2:
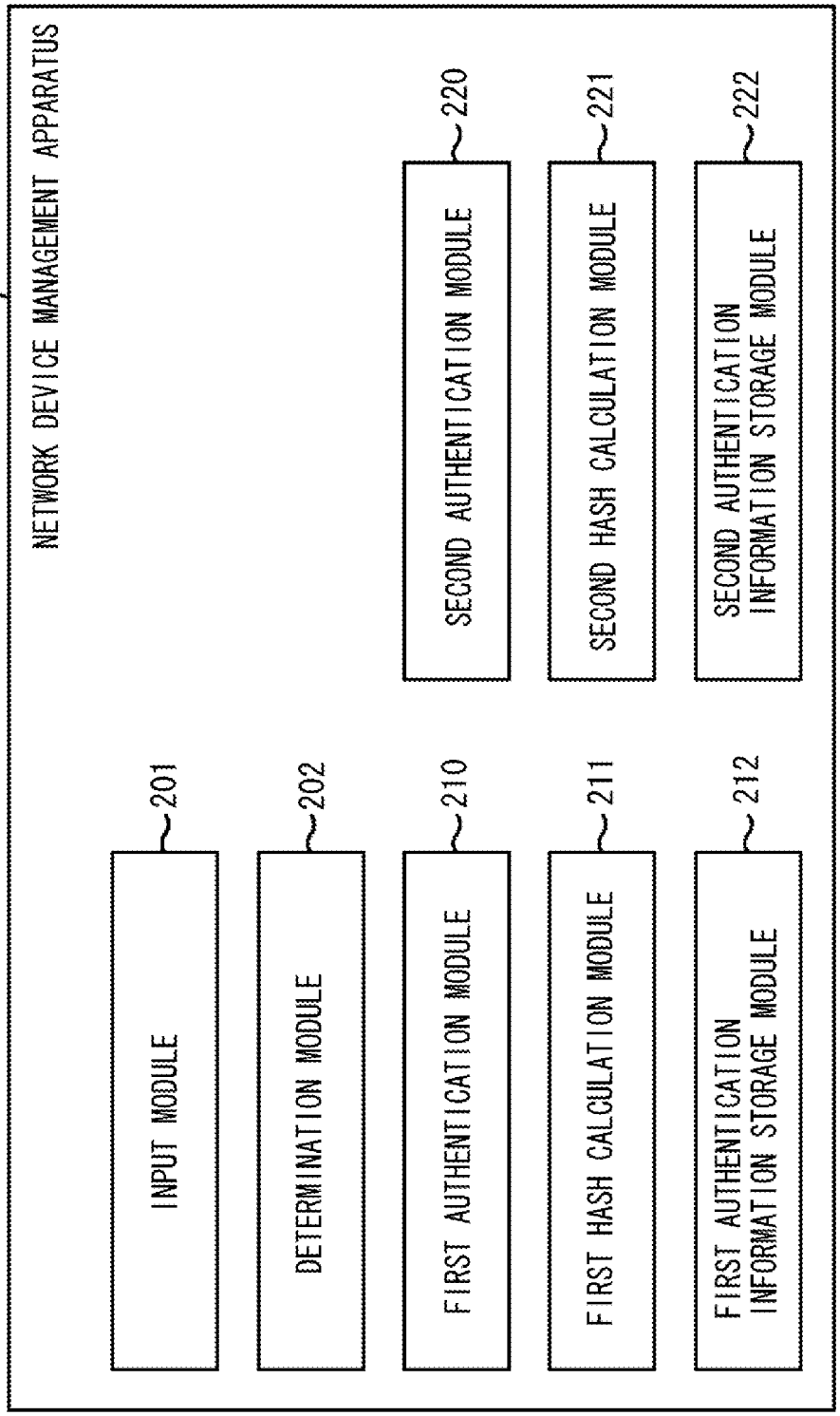
FIG. 2 illustrates an example of the functional configuration (server module configuration) of the network device management apparatus according to the first exemplary embodiment.

FIG. 2 illustrates an example of the functional configuration (server module configuration) of the network device management apparatus 100. The network device management apparatus 100 includes an input module 201, a determination module 202, a first authentication module 210, a first hash calculation module 211, and a first authentication information storage module 212. The network device management apparatus 100 further includes a second authentication module 220, a second hash calculation module 221, and a second authentication information storage module 222.

When the input module 201 accepts input of an account name and a password according to a user's operation, the CPU 101 starts authentication processing. The input module 201 may accept data other than an account name and password.

Figure 3:
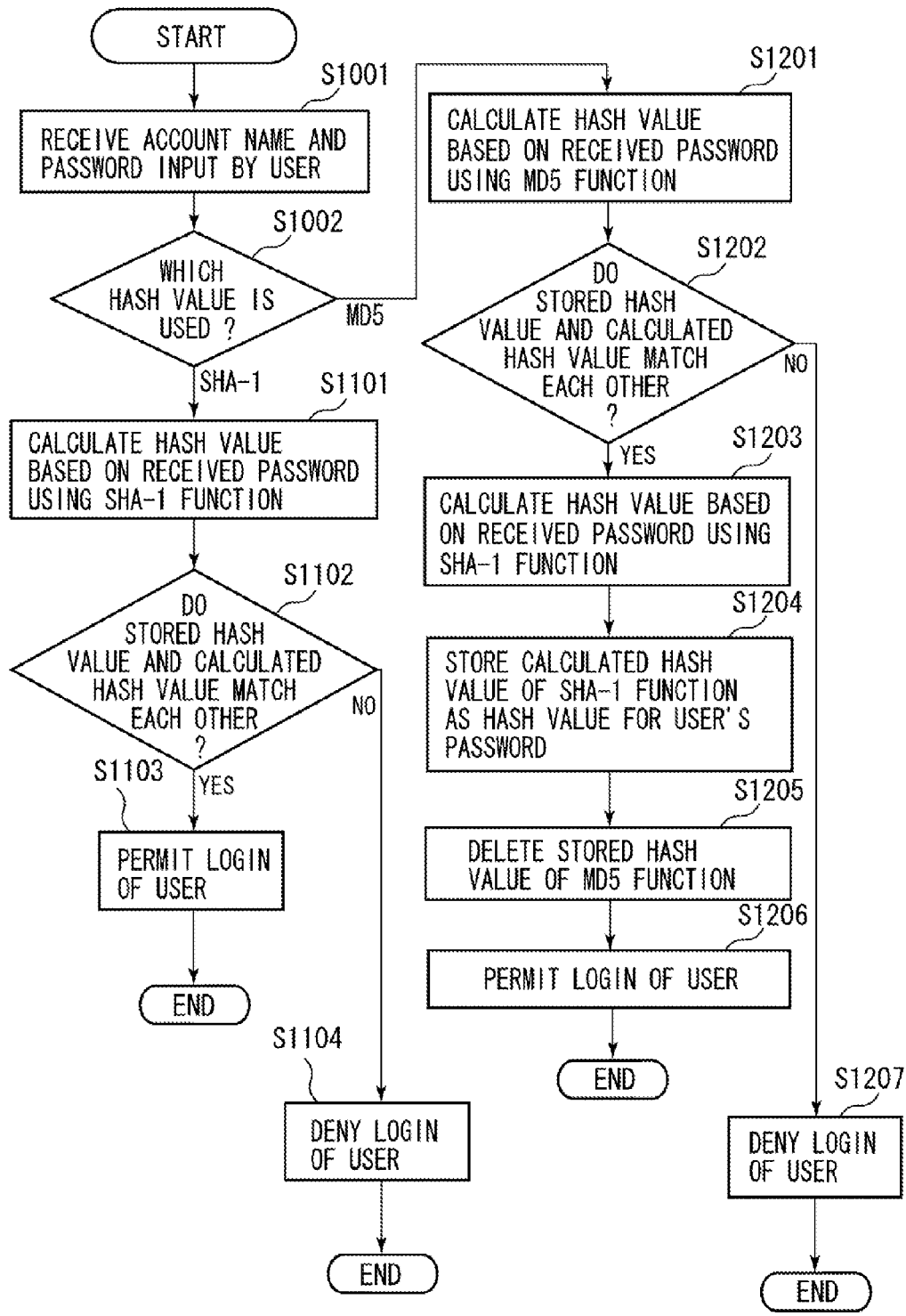
FIG. 3 is a flowchart illustrating an operation example of the network device management apparatus when authenticating user's login according to the first exemplary embodiment.

FIG. 3 is a flowchart illustrating an operation example of the network device management apparatus 100 in authenticating a user's login. Here, for description purposes, it is assumed that a hash function (original hash function) used in the first authentication module 210, the first hash calculation module 211, and the first authentication information storage module 212 is an MD5 function.

Further, it is assumed that a hash function (new hash function) used in the second authentication module 220, the second hash calculation module 221, and the second authentication information storage module 222 is a secure hash algorithm-1 (SHA-1) function. However, other hash functions may be used. In addition, if a password can be converted into a one-way, irreversible value (i.e., the original password cannot be derived from the value), a hash (hash value or hash function) does not need to be used.

First, in step S1001, the input module 201 receives (obtains) an account name and password input by a user. In this exemplary embodiment, user identification information is obtained based on an account name, and user authentication information is obtained based on a password.

Next, in step S1002, the determination module 202 determines a hash which is to be used. More specifically, the determination module 202 determines whether the first authentication information storage module 212 or the second authentication information storage module 222 stores authentication information corresponding to the account name received in step S1001.

Figures 4, 5:
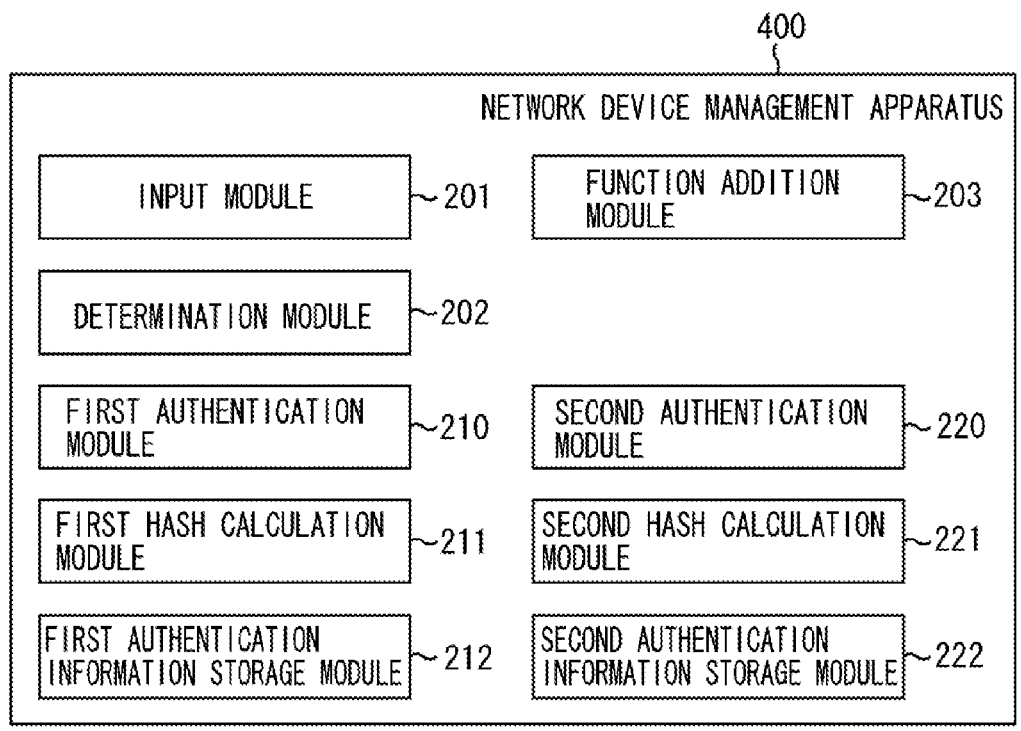
FIG. 4 illustrates an example of an authentication information management table stored in a first authentication information storage device and a second authentication information storage device according to the first exemplary embodiment.
FIG. 5 illustrates an example of the functional configuration (server module configuration) of a network device management apparatus according to a second exemplary embodiment of the present invention.

FIG. 4 illustrates an example of an authentication information management table stored in the first authentication information storage module 212 and the second authentication information storage module 222. An authentication information management table 500 stores the account name and a hash value obtained using the password (authentication information) in association with each other.

The authentication information management table 500 in the first authentication information storage module 212 manages MD5 hash values. The authentication information management table 500 in the second authentication information storage module 222 manages SHA-1 hash values. The authentication information management table 500 may manage information other than the account name and the password.

If the determination result in step S1002 shows that the authentication information corresponding to the account name received in step S1001 is stored in the second authentication information storage module 222 (SHA-1 in step S1002), the processing advances to step S1101. On the other hand, if the authentication information corresponding to the account name received in step S1001 is stored in the first authentication information storage module 212 (MD5 in step S1002), the processing advances to step S1201.

In step S1101, the second hash calculation module 221 calculates a hash value based on SHA-1 using the password received in step S1001.

Next, in step S1102, the second authentication module 220 compares the hash value calculated in step S1101 with the authentication information stored in the second authentication information storage module 222, which corresponds to the account name received in step S1001. Then, the second authentication module 220 determines whether the hash value calculated in step S1101 matches the authentication information stored in the second authentication information storage module 222.

If the determination result shows that the hash value calculated in step S1101 matches the authentication information stored in the second authentication information storage module 222 (YES in step S1102), the CPU 101 determines that user's login is successfully authenticated and advances the processing to step S1103. On the other hand, if the hash value calculated in step S1101 does not match the authentication information stored in the second authentication information storage module 222 (NO in step S1102), the CPU 101 determines that user's login is not successfully authenticated and advances the processing to step S1104.

In step S1103, the determination module 202 permits a user to login to a system. On the other hand, in step S1104, the determination module 202 denies user's login to the system.

As described above, in step S1002, if the authentication information corresponding to the account name received in step S1001 is stored in the first authentication information storage module 212, the processing advances to step S1201. In step S1201, the first hash calculation module 211 calculates a hash value based on MD5 using the password received in step S1001.

In this exemplary embodiment, a first one-way function is realized using MD5, and a first converted value is obtained using a hash value calculated based on MD5.

Next, in step S1202, the first authentication module 210 compares the hash value calculated in step S1201 with the authentication information stored in the first authentication information storage module 212, which corresponds to the account name received in step S1001. Then, the first authentication module 210 determines whether the hash value calculated in step S1201 matches the authentication information stored in the first authentication information storage module 212.

If the determination result shows that the hash value calculated in step S1201 matches the authentication information stored in the first authentication information storage module 212 (YES in step S1202), the CPU 101 determines that user's login is successfully authenticated and advances the processing to step S1203. On the other hand, if the hash value calculated in step S1201 does not match the authentication information stored in the first authentication information storage module 212 (NO in step S1202), the CPU 101 determines that user's login is not successfully authenticated and advances the processing to step S1207.

In step S1203, the second hash calculation module 221 calculates a hash value based on SHA-1 using the received password. In this exemplary embodiment, a second one-way function is obtained based on SHA-1, and a second converted value is obtained based on a hash value calculated based on SHA-1.

Next, in step S1204, the second authentication information storage module 222 stores the hash value calculated using SHA-1 in step S1203 and the account name received in step S1001 in the authentication information management table 500 in association with each other.

Next, in step S1205, the first authentication information storage module 212 deletes the account name received in step S1001 and the authentication information stored in association with the account name.

As described above, since in step S1202, it is determined that user's login is successfully authenticated, in step S1206, the determination module 202 permits user's login to the system.

On the other hand, as described above, in step S1202, if it is determined that user's login is not successfully authenticated (NO in step S1202), the processing advances to step S1207. In step S1207, the determination module 202 denies user's login to the system.

As described above, in this exemplary embodiment, if a hash value obtained based on the original hash function (MD5) is stored as a hash value corresponding to the account name input by a user, a hash value is calculated based on MD5 using the password input by the user. Then, it is determined whether the calculated hash value matches the already-stored hash value.

If the determination result shows that the two hash values match each other (YES in step S1202), the stored hash value is deleted and a new hash value is calculated based on the new hash function (SHA-1) using the password input by the user. Then, the new hash value is stored as a hash value of the password of the user. Accordingly, even if the hash function is changed, a user does not need to change the password. Therefore, a hash algorithm (hash function) used in a system that stores a hash value of a password for authentication can be changed without increasing a burden on a system administrator and without reminding a user of the change of the algorithm.

In the present exemplary embodiment, the apparatus for managing devices (printing device etc.) (not illustrated) connected to the network 150 is described by way of example. However, the present invention is not limited to such an apparatus.

Second Exemplary Embodiment

Next, a second exemplary embodiment of the present invention is described. The above first exemplary embodiment describes an example where only two hash functions (MD5 and SHA-1) are used for illustrative purposes. In the present exemplary embodiment, an additional hash function is used.

As described above, the present exemplary embodiment differs from the above first exemplary embodiment in that the configuration for adding a hash function is included. Thus, in the present exemplary embodiment, identical components to those of the above first exemplary embodiment are denoted by the same reference numerals as illustrated in FIGS. 1, 2, and 4 and their detailed description is omitted.

FIG. 5 illustrates an example of the functional configuration (server module configuration) of a network device management apparatus according to the present exemplary embodiment. A network device management apparatus 400 includes the input module 201, the determination module 202, the first authentication module 210, the first hash calculation module 211, and the first authentication information storage module 212. The network module management apparatus 400 further includes the second authentication module 220, the second hash calculation module 221, and the second authentication information storage module 222. The network module management apparatus 400 further includes a function addition module 203. When the function addition module 203 accepts an additional authentication module, the network device management apparatus 400 starts function addition processing.

Figure 6:
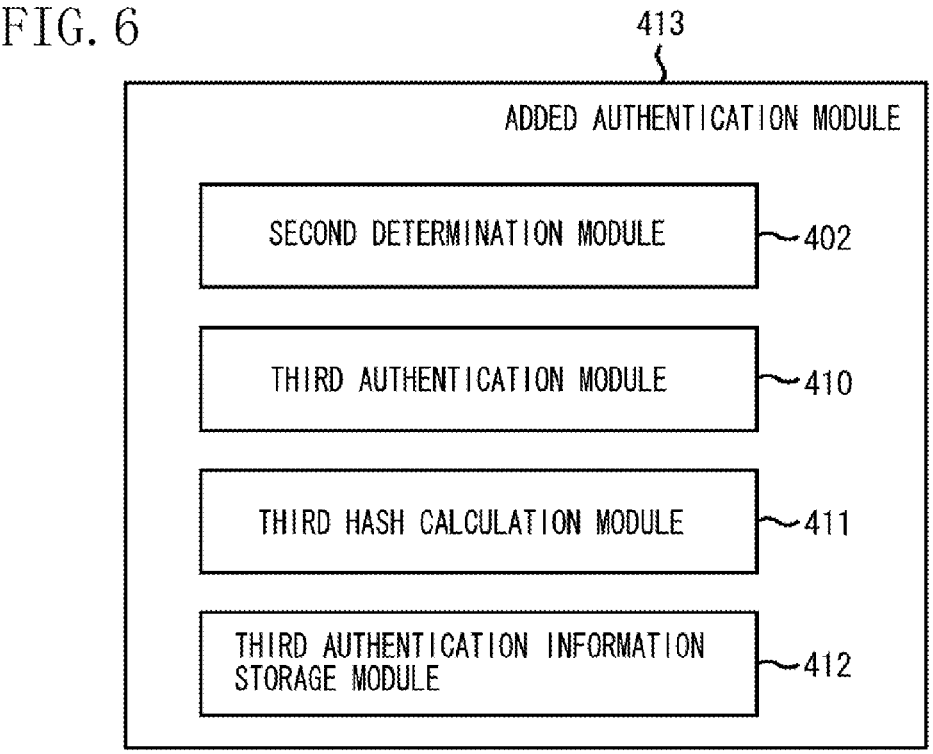
FIG. 6 illustrates a configuration example of an additional authentication module according to the second exemplary embodiment.

FIG. 6 illustrates a configuration example of an additional authentication module. The additional authentication module 413 includes a second determination module 402, a third authentication module 410, a third hash calculation module 411, and a third authentication information storage module 412. The second determination module 402 determines whether the first authentication information storage module 212, the second authentication information storage module 222, or the third authentication information storage module 412 stores authentication information corresponding to an account name received (obtained) by the input module 201.

Figure 7:
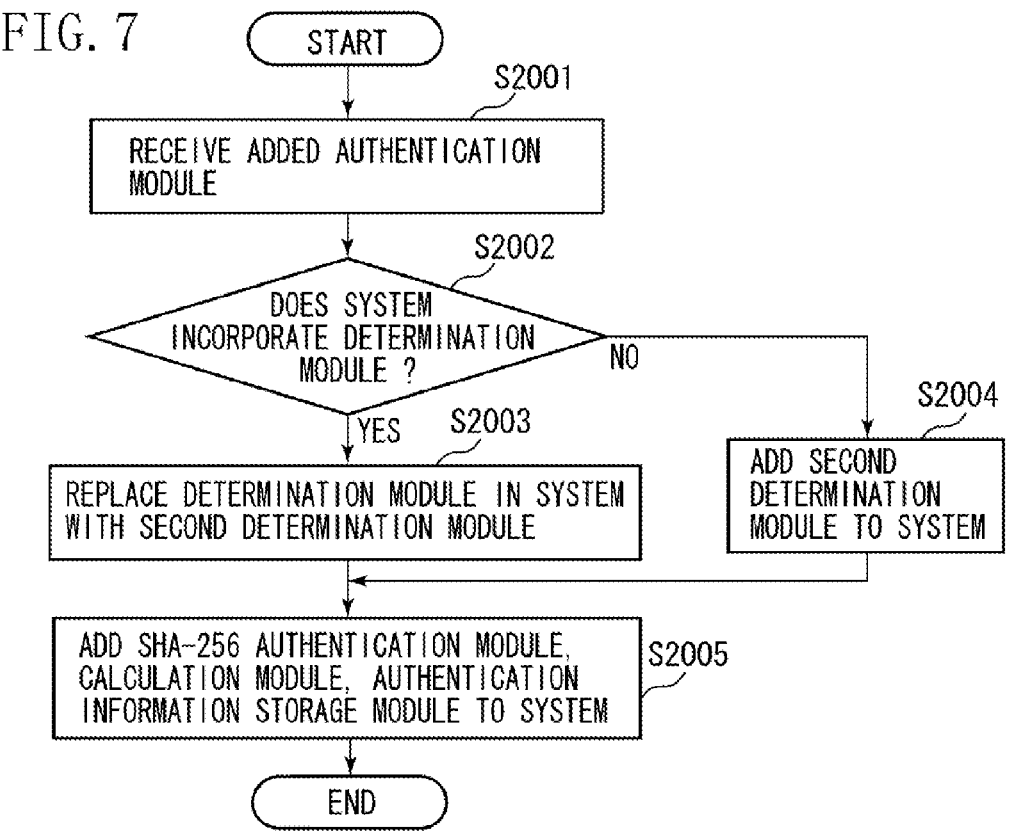
FIG. 7 is a flowchart illustrating an operation example of the network device management apparatus when adding an authentication module according to the second exemplary embodiment.

FIG. 7 is a flowchart illustrating an operation example of the network device management apparatus 400. For purposes of illustration, it is assumed that a hash function used in the third authentication module 410, the third hash calculation module 411, and the third authentication information storage module 412 is a SHA-256 function. However, other hash functions may be used. Further, if a password can be converted into a one-way, irreversible value (i.e., the original password cannot be derived from the value), a hash (hash value or hash function) does not need to be used.

First, in step S2001, the function addition module 203 receives (obtains) the additional authentication module 413.

Next, in step S2002, the function addition module 203 determines whether the network device management apparatus 400 includes the determination module 202.

If the determination result shows that the network device management apparatus 400 incorporates the determination module 202 (YES in step S2002), the processing advances to step S2003. On the other hand, if the network device management apparatus 400 does not incorporates the determination module 202 (NO in step S2002), the processing advances to step S2004.

In step S2003, the function addition module 203 deletes the determination module 202 stored in the network device management apparatus 400 and adds the second determination module 402 to the network device management apparatus 400 in place of the determination module 202. Then, the processing advances to step S2005.

On the other hand, in step S2004, the function addition module 203 adds the second determination module 402 to the network device management apparatus 400. Then, the processing advances to step S2005.

In step S2005, the function addition module 203 adds the third authentication module 410, the third hash calculation module 411, and the third authentication information storage module 412 to the network device management apparatus 400.

Figure 8:
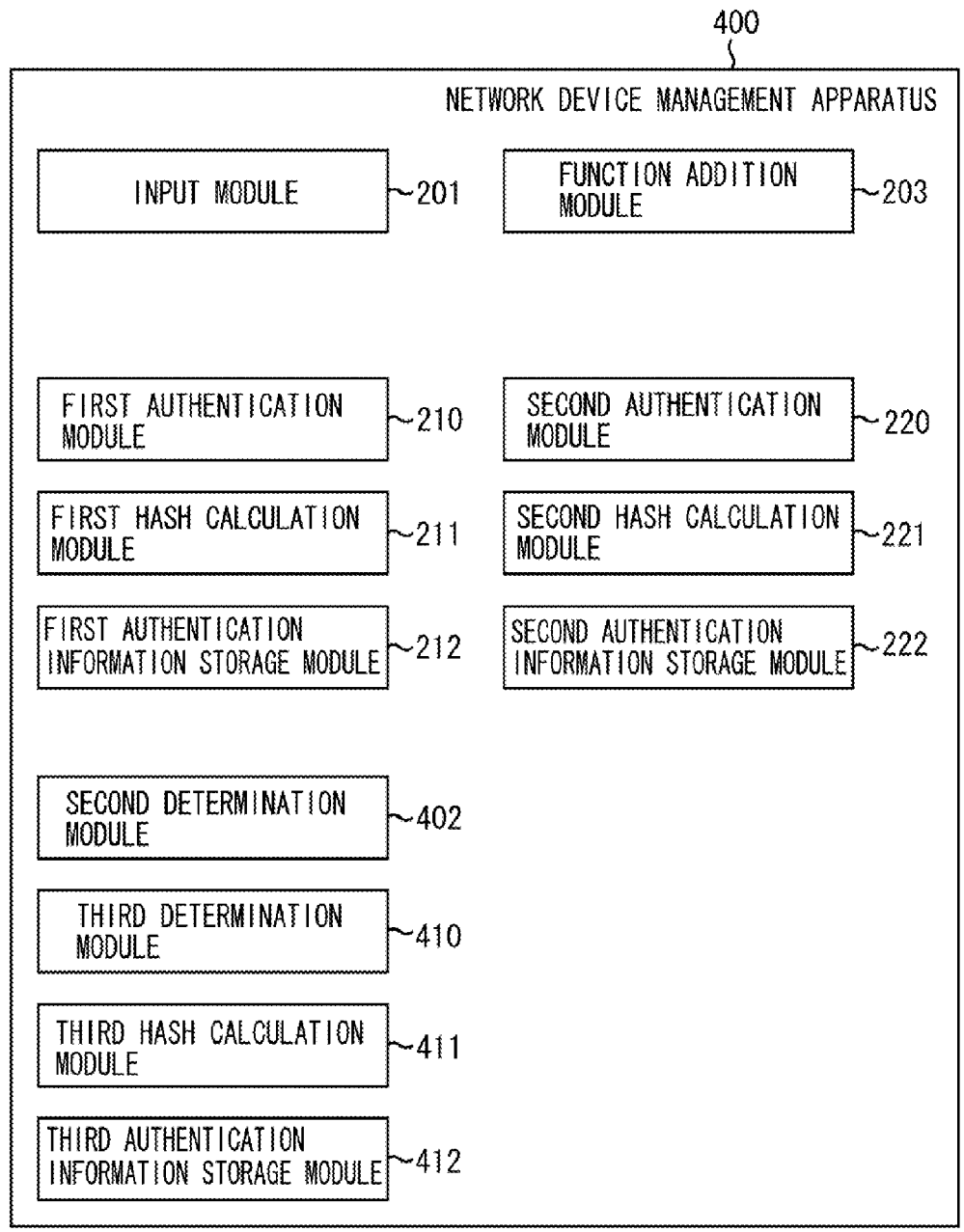
FIG. 8 illustrates an example of the functional configuration (server module configuration) of the network device management apparatus to which an authentication module is added according to the second exemplary embodiment.

FIG. 8 illustrates an example of the functional configuration (server module configuration) of the network device management apparatus 400 to which the authentication module 413 is added.

The network device management apparatus 400 after the authentication module 413 is added includes the input module 201, the function addition module 203, the first authentication module 210, and the first hash calculation module 211. Further, the network device management apparatus 400 includes the first authentication information storage module 212, the second authentication module 220, the second hash calculation module 221, and the second authentication information storage module 222. Furthermore, the network device management apparatus 400 includes the second determination module 402, the third authentication module 410, the third hash calculation module 411, and the third authentication information storage module 412.

In the illustrated example of FIG. 8, when the input module 201 accepts input of an account name and a password according to a user's operation, the network device management apparatus 400 starts authentication processing. The input module 201 may accept information other than a pair of account name and password. Then, the second determination module 402 determines whether the first authentication information storage module 212, the second authentication information storage module 222, or the third authentication information storage module 412 stores authentication information corresponding to the account name received in step S1001.

If the determination result shows that the authentication information corresponding to the account name received in step S1001 is stored in an authentication information storage module (the first authentication information storage module 212 or the second authentication information storage module 222) other than the third authentication information storage module 412, for example, the next processing is performed. A hash value stored in the authentication information storage module (the first authentication information storage module 212 or the second authentication information storage module 222) is compared with a hash value calculated based on a hash function (MD5 or SHA-1) used in the authentication information storage module.

If the hash values do not match each other, user's login is denied. On the other hand, if the hash values match each other, a hash value is calculated based on SHA-256 using the password received in step S1001. Then, the calculated hash value and the account name received in step S1001 are stored in the authentication information management table 500 (third authentication information storage module 412) in association with each other. Further, the account name received in step S1001 and the authentication information stored in association with the account name, which is already stored in the authentication information storage module (the first authentication information storage module 212 or the second authentication information storage module 222) are deleted.

With the above operation, a new one-way function is obtained based on SHA-256, and a new converted value is obtained based on the new one-way function using the hash value calculated based on SHA-256. Further, a first converted value is obtained using a hash value calculated based on MD5 or a hash value calculated based on SHA-1, and a second converted value is obtained using a hash value calculated based on SHA-256.

As described above, in the present exemplary embodiment, the function addition module 203 adds the authentication module 413 to the network device management apparatus 400. Therefore, in addition to effects described in the above first exemplary embodiment, this embodiment produces such an effect that a hash algorithm can be freely changed.

The present exemplary embodiment describes an example where two modules that perform authentication based on a hash function (an authentication module, a hash calculation module, and an authentication information storage module) are already incorporated before the authentication module 413 is added, by way of example. However, the number of modules incorporated prior to the addition of the authentication module 413 is not limited to 2.

Third Exemplary Embodiment

Next, a third exemplary embodiment of the present invention is described. The above first and second exemplary embodiments describe an example where a hash value of a password is updated after a user inputs data. In the present exemplary embodiment, a hash value of a password is automatically updated. A main point of difference between the present exemplary embodiment and the above first and second exemplary embodiments is an operation of updating a hash value of a password.

In the present exemplary embodiment, identical components to those of the above first exemplary embodiment are denoted by reference numerals illustrated in FIGS. 1, 2, and 4 and thus not described in detail. For purposes of illustration, in the present embodiment, the network device management apparatus is configured as illustrated in FIG. 2, but the network device management apparatus may be configured as illustrated in, for example, FIG. 5 or FIG. 8.

First, the determination module 202 searches the authentication information management table 500 in the first authentication information storage module 212 for a hash value that has not been changed for a predetermined period. Then, the first authentication information storage module 212 deletes the hash value that has not been changed for a predetermined period and an account name corresponding to the hash value from the authentication information management table 500.

Then, the second hash calculation module 221 randomly generates a character string and calculates a hash value based on SHA-1 using the generated character string. Next, the second authentication information storage module 222 stores the calculated hash value, and the account name deleted from the authentication information management table 500 in the first authentication information storage module 212 in the authentication information management table 500 in association with each other. Then, if the input module 201 accepts, for example, a predetermined user's operation, a user is informed of the character string, for example, by displaying it as a password.

As described above, in the present exemplary embodiment, a hash value of a password is automatically updated. Thus, in addition to effects described in the above first and second exemplary embodiments, the present exemplary embodiment can result in a reduction in the possibility of attack against a hash algorithm.

Further, an operation of automatically updating a hash value of a password as described in the present exemplary embodiment and an operation of updating a hash value of a password according to user's input as described in the first and second exemplary embodiments may be performed in combination. Furthermore, as described in the present exemplary embodiment, an operation of automatically updating a hash value of a password may be performed solely.

Furthermore, after a hash value that has not been changed for a predetermined period and an account name corresponding to the hash value are deleted from the authentication information management table 500, a hash value of a password may not be updated (a new hash value may not be generated based on a randomly generated character string). With this operation alone, a possibility of attack against a hash algorithm can be reduced.

Other Exemplary Embodiments

The above-described exemplary embodiments of the present invention can be implemented by execution of a program, which is stored in a RAM or ROM of a computer. The scope of the present invention encompasses the program and a computer-readable storage medium storing the program.

Further, the present invention can be embodied as a system, an apparatus, a method, a program, or a storage medium. More specifically, the present invention is applicable to a system constituted of a plurality of devices or an apparatus constituted of only one device.

Further, the present invention can be implemented by directly or remotely supplying software programs that realize the functions of the above exemplary embodiments (in the exemplary embodiments, programs corresponding to the operations in the flowcharts illustrated in FIGS. 3 and 7) to the system or apparatus. In this case, the present invention can be also implemented by a computer of the system or apparatus reading and executing the supplied program code.

Accordingly, the present invention can be achieved by a program code that is installed to a computer so as to implement functional processing of the exemplary embodiments of the present invention in the computer. In other words, the scope of the present invention encompasses a computer program that realizes the functional processing of the exemplary embodiments of the present invention.

In this case, the computer program may be supplied in any form such as an object code, a program executable by an interpreter, or script data supplied to an operating system (OS) insofar as a program function is ensured.

Various recording media can be used for supplying the program. Examples of the media include a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD) (digital versatile disk-read only memory (DVD-ROM), digital versatile disk-recordable (DVD-R)).

As another method for supplying a program, a computer program of the present invention can be supplied by accessing a website on the Internet from a browser of a client computer and downloading the computer program itself or a compressed file having an automatic installation function from the website to a recording medium such as hard disk.

Further, the present invention can be achieved by dividing a program code that constitutes a program of the exemplary embodiments of the present invention into a plurality of files and downloading the files from different websites. In other words, the scope of the present invention encompasses a world wide web (WWW) server that allows a plurality of users to download a program file for implementing the functional processing of the exemplary embodiments of the present invention on a computer.

Furthermore, the present invention can be implemented by distributing the program of the exemplary embodiments of the present invention to users after being encrypted and stored in a storage medium such as a CD-ROM. In this case, a user who meets a predetermined condition is permitted to download key information for decryption from a website via the Internet. Then, the user executes the encrypted program using the downloaded key information to install the program to a computer.

Further, the functions of the above exemplary embodiments can be realized by the computer reading and executing the program. Moreover, the functions of the exemplary embodiments could be also realized by executing a part or all of actual processing with an OS running on the computer based on an instruction of the program.

In addition, the functions of the exemplary embodiments can be realized as follows. A program code read from a recording medium is written to a memory of a function extension board inserted into a computer or a function extension unit connected to a computer. Then, a CPU provided in the function extension board or the function extension unit performs a part or all of actual processing according to an instruction of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus comprising:
   an acquisition circuit configured to acquire inputted authentication information of a user;
   a calculation circuit configured to calculate a value from the acquired inputted authentication information, using one of a first authentication algorithm and a second authentication algorithm; and
   a determination circuit configured to determine whether a first value calculated using the first authentication algorithm is a first stored value already stored in the information processing apparatus,
   wherein, in a case where the determination circuit determines that the first value is the first stored value, a second value is calculated from the acquired authentication information using the second authentication algorithm, the second value being stored in the information processing apparatus, and
   wherein the calculated second value is used for subsequent authentication processing.

2. The information processing apparatus according to claim 1, wherein the first authentication algorithm has a one-way function and the second authentication algorithm has a one-way function different from the one-way function of the first authentication algorithm.

3. The information processing apparatus according to claim 1, wherein the first authentication algorithm is chosen from MD-5 and SHA-1, and the second authentication algorithm is SHA-256.

4. An information processing method comprising:
   acquiring inputted authentication information of a user;
   calculating a value from the acquired inputted authentication information, using a first authentication algorithm or using a second authentication algorithm; and
   determining whether a first value calculated using the first authentication algorithm is a first stored value,
   wherein, if the first value is determined to be the first stored value, a second value is calculated from the acquired authentication information using the second authentication algorithm, and the second value is stored, and
   wherein the calculated second value is used for subsequent authentication processing.

5. The information processing method according to claim 4, wherein the first authentication algorithm has a one-way function and the second authentication algorithm has a one-way function different from the one-way function of the first authentication algorithm.

6. The information processing method according to claim 4, wherein the first authentication algorithm is MD-5 or SHA-1, and the second authentication algorithm is SHA-256.

7. A non-transitory computer-readable storage medium storing a computer program causing a computer to execute operations, the computer program comprising computer-executable instructions for:
   acquiring inputted authentication information of a user;
   calculating a value from the acquired inputted authentication information, using a first authentication algorithm or using a second authentication algorithm; and
   determining whether a first value calculated using the first authentication algorithm is a first stored value,
   wherein, if the first value is determined to be the first stored value, a second value is calculated from the acquired authentication information using the second authentication algorithm, and the second value is stored, and
   wherein the calculated second value is used for subsequent authentication processing.

8. The non-transitory computer-readable storage medium according to claim 7, wherein the first authentication algorithm has a one-way function and the second authentication algorithm has a one-way function different from the one-way function of the first authentication algorithm.

9. The non-transitory computer-readable storage medium according to claim 7, wherein the first authentication algorithm is MD-5 or SHA-1, and the second authentication algorithm is SHA-256.

* * * * *